United States Patent

[11] 3,586,223

| [72] | Inventor | Howard B. Betts<br>Mineola, N.Y. |
|---|---|---|
| [21] | Appl. No. | 805,521 |
| [22] | Filed | Mar. 10, 1969 |
| [45] | Patented | June 22, 1971 |
| [73] | Assignee | Vanguard Instrument Corporation<br>Melville, L.I., N.Y. |

[54] FLICKERLESS PROJECTOR
9 Claims, 4 Drawing Figs.

[52] U.S. Cl. .................................................. 226/9,
226/117, 226/66
[51] Int. Cl. .................................................. G03b 1/28
[50] Field of Search .................................... 226/66, 9,
117, 108, 113; 352/184, 46, 47, 117; 83/263

[56] References Cited
UNITED STATES PATENTS

| 2,465,453 | 3/1949 | Holbrook | 226/117 X |
| 2,791,422 | 5/1957 | Baer | 226/9 |
| 3,332,084 | 7/1967 | Wahrer et al. | 226/9 X |
| 3,394,853 | 7/1968 | Foley et al. | 226/9 |

*Primary Examiner*—Allen N. Knowles
*Attorney*—Ostrolenk, Faber, Gerb & Soffen

ABSTRACT: A motion picture projector includes a stepping mechanism running at constant speed as an intermittent film drive, and a continuously adjustable speed film supply or metering mechanism. A control signal generated each time a frame length of film is provided by the film supply mechanism actuates the intermittent film drive to step the film at a rate controlled by the film supply mechanism speed, with the film drive moving film at the same speed within each step regardless of the supply mechanism speed.

INVENTOR
HOWARD B. BETTS

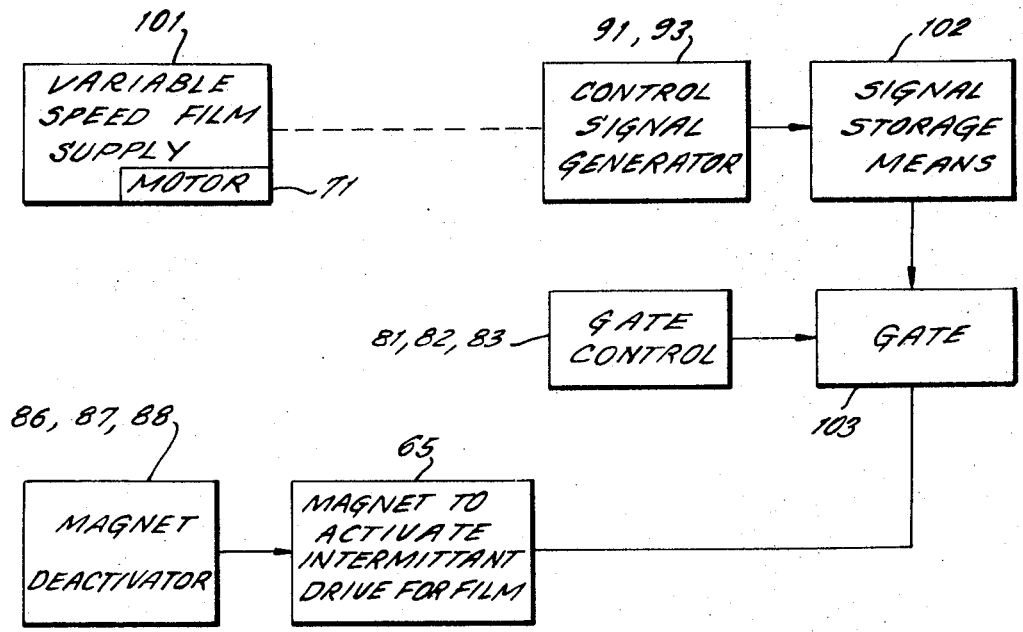
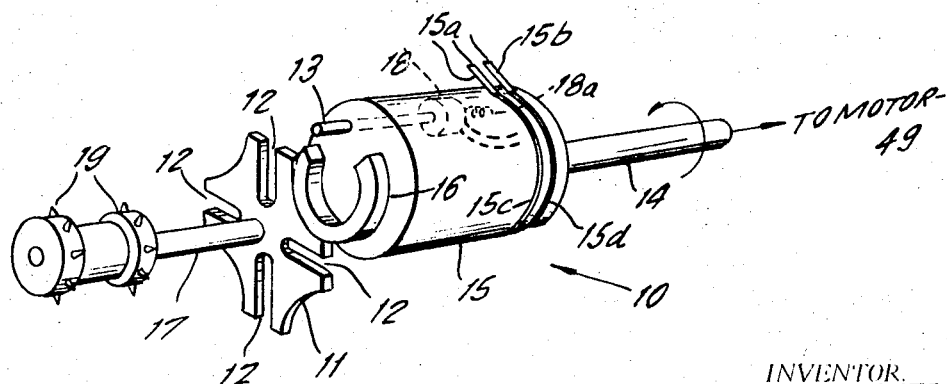

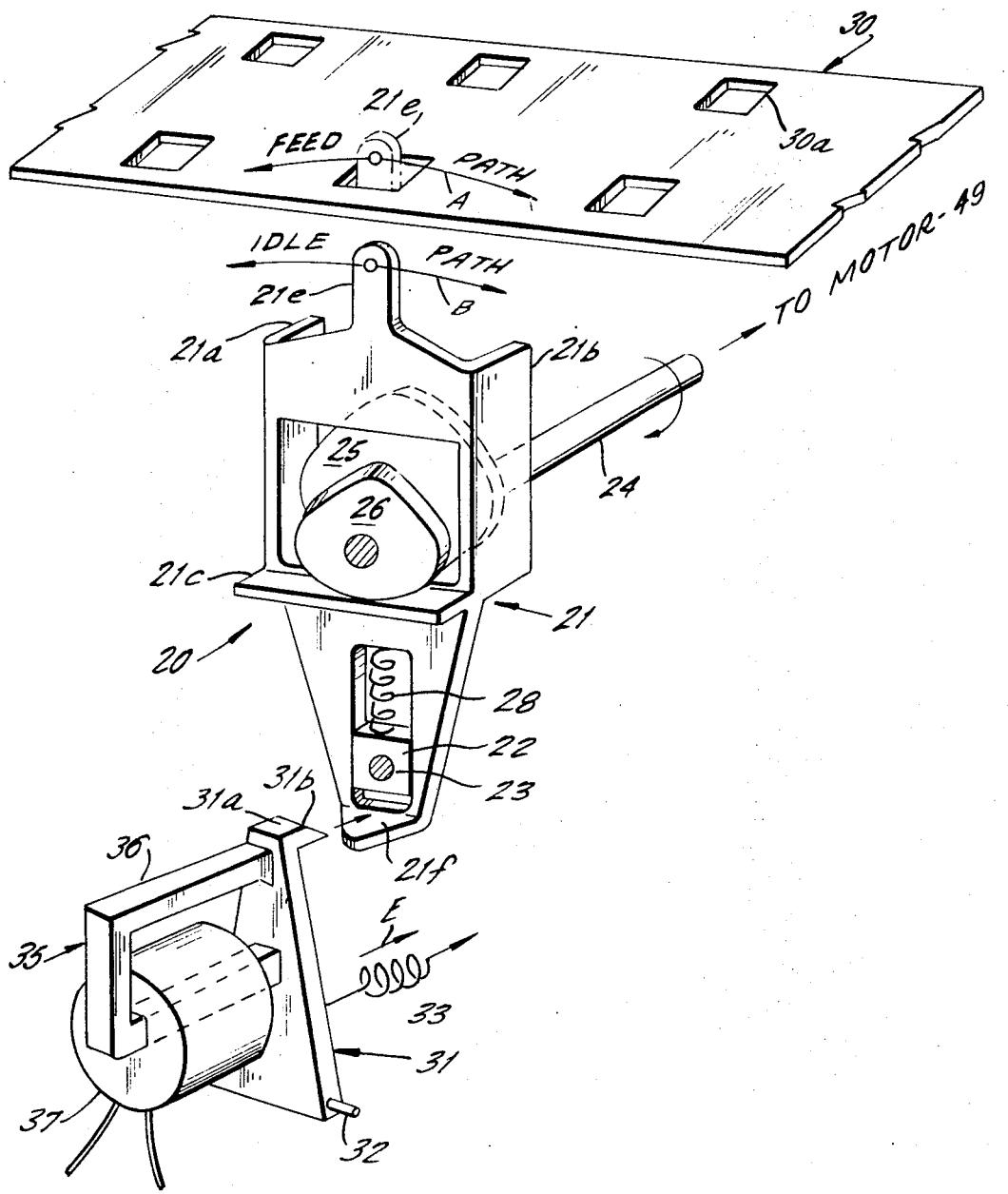

FLICKERLESS PROJECTOR

This invention relates to means for controlling film transport in a projector, and more particularly relates to means for continuously varying the stepping rate for film being moved past a projection aperture by an intermittent drive with film movement during each step being at the same speed regardless of the stepping rate.

Many applications utilizing motion pictures require that film be projected at variable frame rates rather than at the normal fixed projection speed. Conventional projectors may be employed in a limited sense for such application by being run at variable speed. However, as the projection rate decreases, the film pull down time and shutter dark time combine to produce objectionable flicker together with other conditions which adversely effect the quality of picture presentation.

To eliminate such shortcomings the prior art developed a rapidly running intermittent film drive engageable with the film on command at selected submultiples of its feed cycle, say every second, fourth, eighth, etc. The film feeding or metering sprockets are, in turn, controlled from the intermittent drive mechanism and indexed or otherwise driven to feed a corresponding supply of film to maintain constant film loops.

In the device of the instant invention the film supply or metering means is driven by a continuously adjustable speed motor. A control signal is generated each time a frame length of film is provided by the metering means with this control signal being utilized to control engagement of the intermittent drive mechanism with the film for advancing the latter one frame length for each control signal generated.

This type of control is particularly advantageous when handling larger film sizes since the control for maintaining the film loops is greatly simplified by requiring only a simple adjustable speed drive for the film supply, as compared to the prior art which required either rapidly indexed sprockets, with attendant mechanical noise and wear, or required a complex servo-operated system. In addition, the remainder of the control system for the apparatus of the instant invention is simple and straightforward.

Accordingly, a primary object of the instant invention is to provide novel and improved apparatus for driving film at adjustable frame rates.

Another object is to provide a film transport including an intermittent drive means operated at constant speed and controlled by signals generated each time a frame length of film is provided by a supply means driven by a continuously adjustable speed motor.

Still another object is to provide novel means for controlling intermittent film drives of either the Geneva type or the cam and claw type.

These as well as other objects of this invention will become readily apparent after reading the following description of the accompanying drawings in which:

FIG. 2 is an operational blocked diagram for the apparatus of FIG. 1.

FIG. 3 is a perspective of a Geneva-type intermittent feed that may be used in place of the intermittent feed illustrated in FIG. 1.

FIG. 4 is a perspective of a simplified cam and claw type intermittent feed that may be used in place of the intermittent feed illustrated in FIG. 1.

Figure 1:
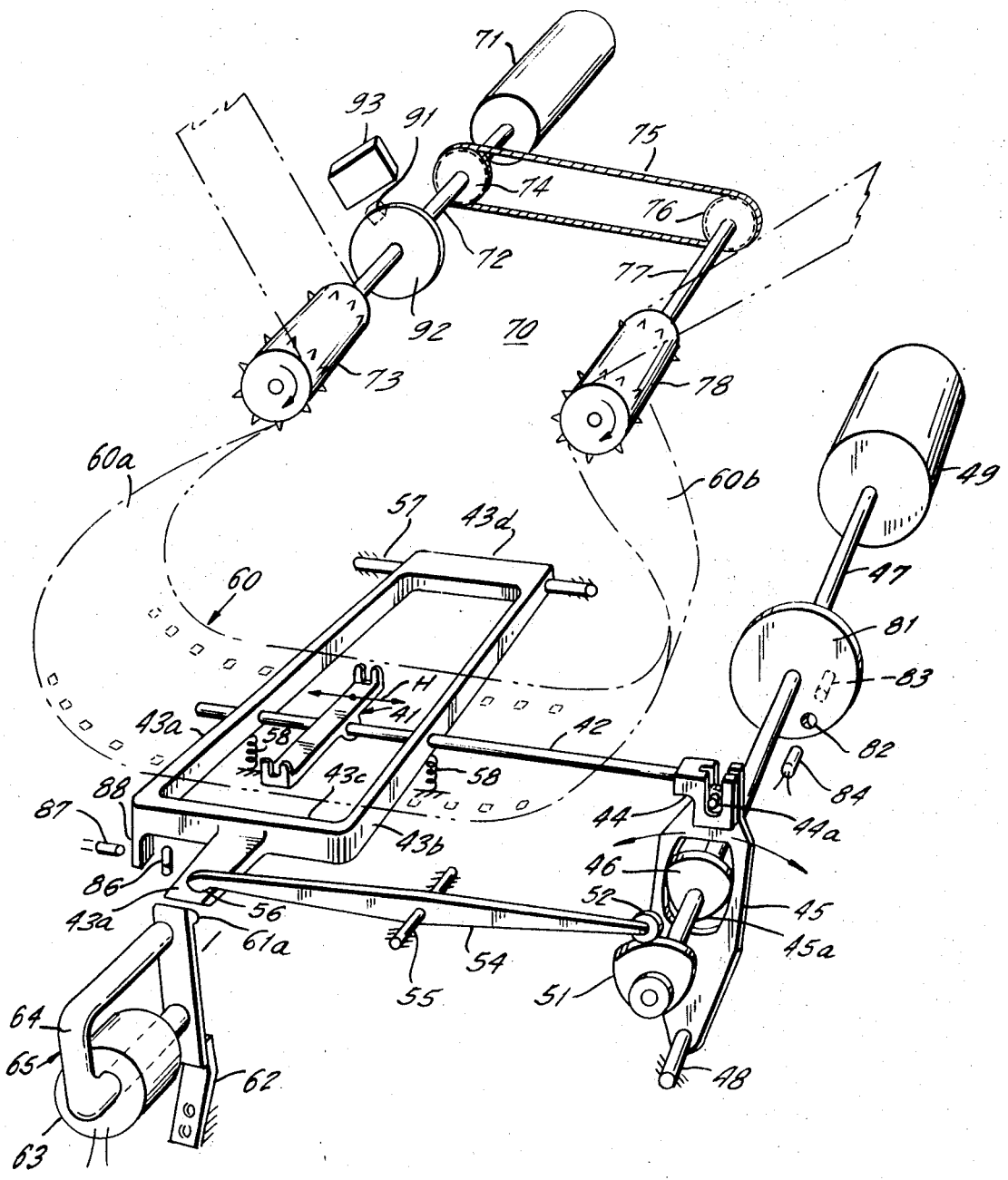
FIG. 1 is a schematic illustrating a film advancing mechanism constructed in accordance with teachings of the instant invention.

Now referring to the figures. As will become obvious the control system to be hereinafter described is capable of being applied to either a Geneva-type intermittent drive as in FIG. 3 or a claw and cam type intermittent drive as in FIG. 4. For each construction, the intermittent drive mechanisms are modified so that its film feed action is controlled by signals generated each time a new frame length of film is advanced toward the intermittent drive mechanism.

With particular reference to FIG. 3, Geneva-type intermittent drive 10 includes star wheel 11 having four slots 12 to receive drive pin 13 extending parallel to and laterally offset from input shaft 14 driven at constant speed. Drive shaft 14 mounts cylindrical carrier 15 to which drive pin 13 is mounted for rotation about shaft 14 as a center. The left end of carrier 15 mounts locking ring 16 which cooperates with the concave peripheral surface portions of star wheel 11 to act as an anti backlash drive. Spring 18a biases drive pin 13 to the left with respect to FIG. 3 to an extended or driving position wherein for each revolution of shaft 14 drive pin 13 enters one of the slots 12 and steps output shaft 17 a quarter of a revolution. When solenoid 18 mounted within carrier 15 is energized through brushes 15a, 15b engaging slip rings 15c, 15d, drive pin 13 moves to the right with respect to FIG. 3 to a retracted or idle position so that rotation of intershaft 14 is ineffective to drive output shaft 17 Film stepping sprockets 19,19 are keyed to shaft 17 and are proportioned so that for each quarter revolution of output shaft 17, film is stepped by one frame length.

Modified cam and claw type intermittent feed mechanism 20 of FIG. 4 includes claw plate 21 mounted to slider block 22 and pivot pin 23. Input shaft 24 driven at constant speed drives advance cam 25 and lifter cam 26 both in operative engagement with claw plate 21. In particular, advance cam 25 engages rearwardly turned arms 21a, 21b of claw plate 21 causing the latter to rock about pin 23 back and forth along the direction of feed for film 30. Lifter cam 26 engages horizontal ledge 21c of claw plate 21 to drive claw 21e from its raised driving position, extending through a sprocket hole 30a at the film feed path indicated by arrow A, to an idle path, below film 30 and indicated by double headed arrow B. Compression spring 28 bears against slider block 22 and biases claw plate 21 upward toward feed path A.

The bottom of claw plate 21 is outwardly turned at 21f to form a latching ear engageable by latching tip 31a of latch member 31. The latter is pivotally mounted, at its end opposite tip 31a, to pin means 32. Tension spring 33 biases latch 31 clockwise about pin 32 in a direction indicated by arrow E to a latching position wherein ear 21f is movable beneath tip 31a.

Electromagnet 35 consists of U-shaped magnetic frame 36 and multiturn coil 37 wound around a leg of frame 36. When coil 37 is energized, magnetic flux generated thereby attracts latch 31 to frame 35 thereby moving tip 31a to the left of latching ear 21f so latch 31 is no longer in latching position. Thus, claw 21e is movable upward to feed path A by spring 20h only when latch 31 is pivoted counterclockwise about pin 32 to unlatching position. With claw 21e at feed path A, subsequent rotation of lifter cam 26 drives claw plate 21 downward and with latch 31 in latching position gear 21f rides on inclined surface 31b at the right of tip 31a momentarily forcing the latter to the left and permitting latching gear 21f to move therebelow. Tip 31a thereafter blocks gear 21f and prevents claw 21e from moving upward above idle path B.

Now referring more particularly to FIG. 1 which shows a modification of the cam and claw intermittent mechanism in combination with a control system constructed in accordance with the instant invention. In particular, film advance claw 41 is fixedly mounted to rod 42 and is positioned between parallel arms 43a, 43b of rectangular frame 43. Rod 42 extends through aligned apertures in arms 43a, 43b, is reciprocated by movement parallel to the longitudinal axis of rod 42. At a point remote from claw 41, combination clevis and yoke 44 including pin 44a connects rod 42 to claw plate 45 so as to permit vertical sliding with respect to pin 44a, while preventing claw 41 from rotating. Advance cam 46 keyed to input shaft 47 is mounted within plate window 45a so that upon rotation of shaft 47 plate 45 is caused to rock about stationary pivot 48 at the end of plate 45 remote from pin 44a, thereby causing claw 41 to reciprocate along the path indicated by double-headed arrow H.

Input shaft 47 is driven by constant speed motor 49 and also drives lifter cam 51, the latter acts through cam follower 52 mounted to one end of rocker arm 53 pivoted at the center thereof to pin 55. The other end of arm 54 is provided with nose 56 that engages latching ear 43e extending from frame arm 43c which connects frame arms 43a and 43b at the ends thereof remote from frame arm 43d where frame 43 is pivoted to stationary pin means 57. Compression springs 58 engage arms 43a and 43b at points intermediate the ends thereof to bias frame 43 in an upward direction with respect to FIG. 1, toward the underside of film strip 60.

Elongated latch 61 is mounted at one of its ends to leaf spring 62 and is biased thereby toward latching position, or in the direction indicated by arrow J so that latching tip 61a thereof may engage latching ear 43e to hold frame 43 in a lowered position wherein the teeth of claw 41 are below the feed path of film 60. When winding 63 of electromagnet 65 is energized, magnetic flux generated thereby attracts latch 61 to magnetic frame 64 moving latching tip 61a to unlatching position.

Film supply or metering section 70 includes continuously adjustable speed motor 71 whose output shaft 72 is keyed to feeding sprocket 73 as well as to gear 74. The latter acts through closed loop chain 75 to drive gear 76 keyed to shaft 77 having takeup sprocket 78 keyed thereto. In a manner well known to the art suitable guide rollers maintain film strip 60 in operative engagement with sprockets 73 and 78 so that the rotation of feed sprockets 73 tends to increase the size of film loop 60a and the rotation of takeup sprocket 78 tends to decrease the size of film loop 60b. Film 60 is drawn from a supply reel (not shown) and delivered to a takeup reel (not shown).

Discs 81 keyed to motor shaft 47 and having aperture 82 cooperates with light source 83 and photopickup 84 to produce gating signals so that electromagnet 65 may release latch 61 only when lifter cam 51 is near the equivalent bottom dead center position. This prevents release of latch 61 at a time when lifter cam 51 is in a position where it could rise halfway through a feed stroke and thereby not properly engage the film and not feed a full frame length.

Another photodetector, including light source 86 and photopickup 87 with frame extension 88 positionable therebetween, is provided to detect the fact that frame 43 had actually risen to a point where claw 41 moves to the film feed path and is effective to feed a frame of film. An additional signal generating means consists of magnet 91 carried at the periphery of disc 92 keyed to motor shaft 72. Each time magnet 91 moves past magnetic reed switch 93 the latter generates a control signal. With the elements arranged as in FIG. 1, for each revolution of shaft 72, feed sprocket 73 moves a frame length of film toward the intermittent drive.

The control for latch releasing magnet 65 is shown in the block diagram of FIG. 2. That is, variable speed film supply 101, including motor 71, operates control pulse generator 91,93 which produces control signals fed to pulse storage means 102. The latter feeds signals through gate 103 to control the actuation of magnet 65. Control for gate 103, to permit control pulses to pass therethrough to magnet coil 63, is provided by signal generator 81,82,83. Elements 86,87,88 constitute a magnet deactuator which deenergizes coil 63 to release latch 61 only after claw 41 has been raised to film feeding position.

When the apparatus illustrated in FIG. 1 is being used, the operator adjusts motor 71 to operate at the speed required to obtain the desired projected picture rate. For each frame length of film fed by sprocket 73, switch 93 generates a control signal which is transmitted through storage means 102 and gate 103 to actuate electromagnet 65. Operation of gate 103 is controlled by signals from photodetector 84. Signals from another photodetector 87 indicate that claw 41 has moved upward and a feed cycle has occurred so that the control circuit for the intermittent drive may be reset to operate through another cycle on demand.

While two motors 49 and 71 have been provided to operate the intermittent drive and film supply, respectively, it should be obvious to one skilled in the art that equivalent operation may be achieved by utilizing a single constant speed motor to operate the intermittent drive and as the input of a drive means, continuously adjustable over a predetermined operational range of speed, for operating the film supply.

Although there has been described a preferred embodiment of this novel invention, many variations and modifications will now be apparent to those skilled in the art. Therefore, this invention is to be limited, not by the specific disclosure herein, but only by the appending claims.

I claim:

1. Apparatus for moving a film strip including a stepping means for imparting intermittent motion to a film strip; a film supply means for delivering film to said stepping means; first means for operating said stepping means to move a predetermined length of film delivered to said stepping means by said supply means; second means for generating a control signal each time said supply means has delivered said predetermined length of film to said stepping means; said control signals being coupled to said first means to control operation thereof whereby the frequency at which control signals are received by said second means determines the stepping rate for film being moved by said stepping means; a constant speed first motor for driving said stepping means and an adjustable speed second motor for driving said film supply means.

2. Apparatus as set forth in claim 1 in which speed of said second motor is continuously adjustable over an operational range.

3. Apparatus for moving a film strip including a stepping means for imparting intermittent motion to a film strip; a film supply means for delivering film to said stepping means; first means for operating said stepping means to move a predetermined length of film delivered to said stepping means by said supply means; second means for generating a control signal each time said supply means has delivered said predetermined length of film to said stepping means; said control signals being coupled to said first means to control operation thereof whereby the frequency at which control signals are received by said second means determines the stepping rate for film being moved by said stepping means; a motor for driving said stepping means; said stepping means including a portion providing an interruptable driving connection between said motor and a film strip to be moved by said stepping means; said first means including biasing means urging said portion toward a first position wherein said stepping means is effective to move film; said first means also including a section for operating said portion against force of said biasing means to a second position wherein said stepping means is ineffective to more film; actuation of said section being controlled by said control signals.

4. Apparatus as set forth in claim 3, in which there is a constant speed first motor for driving said stepping means and an adjustable speed second motor for driving said film supply means.

5. Apparatus for moving a film strip including a stepping means for imparting intermittent motion to a film strip; a film supply means for delivering film to said stepping means; first means for operating said stepping means to move a predetermined length of film delivered to said stepping means by said supply means; second means for generating a control signal each time said supply means has delivered said predetermined length of film to said stepping means; said control signals being coupled to said first means to control operation thereof whereby the frequency at which control signals are received by said second means determines the stepping rate for film being moved by said stepping means; said stepping means including a film advancing claw mounted for movement between a film driving position and an idle position; biasing means urging said claw to said film driving position; cam means for operating said claw to said idler position; latch means for maintaining said claw in said idle position; actuation of said first means responsive to said control signals being effective to release said latch means and permit said biasing means to operate said claw to said film driving position.

6. Apparatus as set forth in claim 5 in which said first means includes an electromagnet which upon energization thereof releases said latch means; additional means for energizing said electromagnet responsive to each of said control signals generated by said second means; further means for deenergizing said electromagnet between occurrences of said control signals after said claw has moved to said film driving position.

7. Apparatus as set forth in claim 6, in which there is a constant speed means for driving said stepping means; and means continuously adjustable in speed within an operational range for driving said film supply means.

8. Apparatus for moving a film strip including a stepping means for imparting intermittent motion to a film strip; a film supply means for delivering film to said stepping means; first means for operating said stepping means to move a predetermined length of film delivered to said stepping means by said supply means; second means for generating a control signal each time said supply means has delivered said predetermined length of film to said stepping means; said control signals being coupled to said first means to control operation thereof whereby the frequency at which control signals are received by said second means determines the stepping rate for film being moved by said stepping means; said stepping means including a Geneva mechanism including a star wheel and a driving pin; means mounting said pin for rotation about an axis extending parallel to said pin and laterally offset therefrom; biasing means urging said pin to a driving position wherein for each revolution of said pin about said axis said pin engages said wheel and rotates the latter through a partial revolution; actuation of said first means responsive to said control signals being effective to retract said pin from said driving position to an idle position wherein rotation of said pin about said axis is ineffective to impart motion to said wheel.

9. Apparatus as set forth in claim 8, in which said first means includes an electromagnet which upon energization thereof operation said pin from said driving position to said idle position; additional means for energizing said electromagnet responsive to each of said control signals generated by said second means; further means for deenergizing said electromagnet after each time said wheel is rotated through said partial revolution by said pin; a constant speed means for driving said stepping means; and means continuously adjustable in speed within an operational range for driving said film supply means.

UNITED STATES PATENT OFFICE
CERTIFICATE OF CORRECTION

Patent No. 3,586,223          Dated June 22, 1971

Inventor(s) Howard B. Betts

It is certified that error appears in the above-identified patent and that said Letters Patent are hereby corrected as shown below:

In Column 4, lines 25, 42 and 69, "second" should be --first--

In Column 6, line 1, "second" should be --first--

Signed and sealed this 4th day of January 1972.

(SEAL)
Attest:

EDWARD M. FLETCHER, JR.          ROBERT GOTTSCHALK
Attesting Officer                Acting Commissioner of Patents